US008724130B2

(12) United States Patent
Stevenson et al.

(10) Patent No.: US 8,724,130 B2
(45) Date of Patent: May 13, 2014

(54) DISPLAYING POWER-ON INSTRUCTIONS DURING POWER-SAVING MODE USING BISTABLE DISPLAY

(71) Applicant: Xerox Corporation, Norwalk, CT (US)

(72) Inventors: Duncan I. Stevenson, Hertfordshire (GB); Asad K. Raja, Rawalpindi (PK)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/672,168

(22) Filed: Nov. 8, 2012

(65) Prior Publication Data

US 2013/0063755 A1 Mar. 14, 2013

Related U.S. Application Data

(63) Continuation-in-part of application No. 13/159,794, filed on Jun. 14, 2011.

(51) Int. Cl.
*G06F 3/12* (2006.01)
*G06K 15/00* (2006.01)
*H04N 1/00* (2006.01)
*G05F 1/10* (2006.01)

(52) U.S. Cl.
USPC ............ 358/1.13; 358/1.14; 358/437; 307/99

(58) Field of Classification Search
None
See application file for complete search history.

(56) References Cited

U.S. PATENT DOCUMENTS

| | | |
|---|---|---|
| 6,032,004 A | 2/2000 | Mirabella, Jr. et al. |
| 6,611,271 B2 | 8/2003 | Harper et al. |
| 6,724,519 B1 | 4/2004 | Comiskey et al. |
| 7,284,708 B2 | 10/2007 | Martin |
| 7,352,503 B2 | 4/2008 | Yang et al. |
| 7,550,101 B2 | 6/2009 | Yang et al. |
| 7,761,332 B2 | 7/2010 | Capurso et al. |
| 2002/0136585 A1 | 9/2002 | Allen et al. |
| 2008/0144070 A1* | 6/2008 | Mori et al. ................... 358/1.13 |

OTHER PUBLICATIONS

U.S. Appl. No. 13/159,794, Office Action Communication Dated Jun. 28, 2013, pp. 1-17.

* cited by examiner

*Primary Examiner* — Thomas Lett

(74) *Attorney, Agent, or Firm* — Gibb & Riley, LLC

(57) ABSTRACT

Methods and systems monitor the activity usage level of a printing apparatus and place the printing apparatus into a power saving mode based on the activity usage level. Such methods and systems sense whether the power supply is to be disconnected from the graphic user interface based on the printing device going into the power saving mode. The graphical user interface comprises a bistable display that continues to show a most recently provided screenshot after the power supply is disconnected. Such methods and systems cause the graphic user interface to display power saving mode information of the printing apparatus (instructions for a user to take to have the printing apparatus leave power saving mode) immediately prior to the power supply being disconnected from the graphic user interface, such that the graphic user interface continues to display the power saving mode information after being disconnected from the power supply.

16 Claims, 5 Drawing Sheets

DISPLAYING POWER-ON INSTRUCTIONS DURING POWER-SAVING MODE USING BISTABLE DISPLAY

CROSS-REFERENCE TO RELATED APPLICATIONS

This application is a Continuation-In-Part of U.S. application Ser. No. 13/159,794 filed Jun. 14, 2011, the complete disclosure of which, in its entirety, is herein incorporated by reference.

BACKGROUND

Embodiments herein generally relate to printer devices and more particularly to displaying the status of a printer apparatus during periods when the power supply is off using a bistable display that does not require power to maintain a screenshot.

Manufacturers of devices, such as printing devices, are making greater use of power-saving modes to allow their devices to consume less power, and to comply with ever-tightening governmental regulations. Power saving modes are reduced power modes that use less power than full power modes; however, in power saving mode, most device functions are not available. When entering power-saving modes, most devices disconnect the power being supplied to graphic user interfaces because conventional graphic user displays, such as liquid crystal displays (LCD) are constantly being refreshed and rely on emitted light, such as a backlight, that requires constant power to be observable. Thus, existing graphic user displays used by printing devices consume a couple of watts of power. Liquid crystal displays need a constant backlight, and constantly consume power.

Further, when a device has entered a power saving mode, typically a user walking up to the machine will be presented with a blank screen and possibly a single button that may be lit. Therefore, it may not be obvious to the user what to do to bring the printing apparatus out of power saving mode or power off mode. Alternatively, attaching a label explaining what to do to bring the printing apparatus out of power saving mode or power off mode is complicated (and may be in the wrong language) and would be redundant when the machine is on and the user interface is working in full-power mode.

SUMMARY

In view of the foregoing, the embodiments herein control whether the power supply is connected to and supplies power to the graphic user interface of a printing apparatus during power saving mode. These methods and systems monitor the activity usage level of a printing apparatus having a graphic user interface and place the printing apparatus into a power saving mode based on the activity usage level. Such methods and systems sense whether the power supply is to be disconnected from the graphic user interface based on the printing device going into the power saving mode. The graphical user interface comprises a bistable display that continues to show a most recently provided screenshot after the power supply is disconnected from the graphic user interface. Such methods and systems cause, using the processor, the graphic user interface to display power saving mode information of the printing apparatus (instructions for a user to take to have the printing apparatus leave power saving mode) immediately prior to the power supply being disconnected from the graphic user interface, such that the graphic user interface continues to display the power saving mode information after being disconnected from the power supply.

Therefore, various embodiments herein comprise different forms of a printing apparatus that include at least one power supply operatively connected to (directly or indirectly connected to) a processor, a printing engine, and a graphic user interface. Further, the processor controls whether the power supply is connected to and supplies power to the processor, the printing engine, and the graphic user interface. The graphical user interface comprises a bistable display that continues to show the most recently provided screenshot after the power supply is disconnected from the graphic user interface. The processor causes the graphic user interface to display power saving mode information of the printing apparatus immediately prior to disconnecting the power supply from the graphic user interface, such that the graphic user interface displays the power saving mode information after being disconnected from the power supply. Thus, the processor delays disconnection of the power supply from the graphic user interface until the power saving mode information is displayed on the graphic user interface.

Alternatively, instead of delaying disconnection of the power supply, the processor can engage an auxiliary power supply to cause the graphic user interface to display power saving mode information of the printing apparatus immediately after the power supply is disconnected from the graphic user interface, such that the graphic user interface will display the power saving mode information after being disconnected from the power supply. Afterword, the processor disengages the auxiliary power supply once the graphic user interface displays the power saving mode information.

The power saving mode information comprises, for example, instructions for a user to take to have the printing apparatus leave power saving mode and can also include consumable supply levels, printer operational status, and/or warning messages. The bistable display can be, for example, an electrophoretic display, an e-ink display, a bichromal balls display, etc.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
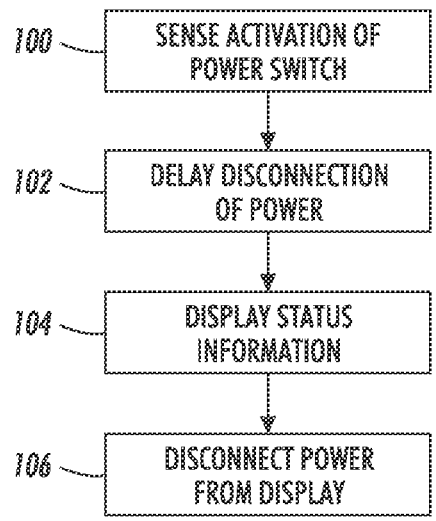
FIG. 1 is a flowchart illustrating an embodiments herein.

As mentioned above, existing liquid crystal displays need a constant backlight, and consume power all the time. Electrophoretic displays or "E-ink" displays differ from their LCD counterparts in that they rely on reflected light, whereas LCD's rely on emitted light. Thus, LCD displays are bound by their requirement of a backlight as such require constant power. Furthermore, electronic ink displays look natural with a high contrast ratio, just like printed paper, thus offering a comfortable viewing experience which is not subject to glare.

Electronic ink displays consume power only when they are updated, further reducing the relative power consumption. Since e-ink requires such low power, it can be fed by means other than the power supply such as photoelectric cells placed on strategic locations which convert ambient light to power; making it all the more environmentally friendly. Displays incorporating electronic ink can be easily read in direct sunlight or under any ambient light, with no glare. In dark areas, light sources can be used to facilitate reading.

E-ink displays do not need power to stay on. Indeed, when power supply is cut, E-ink displays retain the last image almost indefinitely. With some software manipulation important information such as machine copy logs, the amount of toner left, amount of ink, jam status etc will be visible even after the power supply has been turned off. This will ensure that the next user is aware of the problems without even turning on the machine and then waiting for the relevant prompt on the GUI and can thus rectify them, thereby improving productivity.

Liquid crystal displays tend to be bulkier, weightier and a lot more delicate than their electronic ink counterparts. It goes without saying the level of complexity in changing LCD displays is significantly more than that of electronic ink displays which just have a single connector and the whole sheet can be easily replaced. Also, electronic ink displays tend to be flexible and can be shaped around a curve. They are more durable than LCDs as well. Just like LCDs, E-ink displays allow touch screen interaction.

As mentioned above, it may not be obvious to the user what to do to bring the printing apparatus out of power saving mode or power off mode, especially if the power has been disconnected from the graphic user interface. Therefore, the systems and methods herein use a bistable display to (without consuming power) constantly present instructions to bring the printing apparatus out of power saving mode or power off mode. For example, the bistable display can state: "press green button to activate machine" or similar messages. Further, such messages can be presented in the language that has been previously selected for the device. The bistable display can also help inform the user about other conditions of the machine while in power save mode. For example, the bistable display can remind people to order more supplies or that there are secure print jobs in the queue.

FIG. 1 is flowchart illustrating an exemplary method herein. In item 100, this method senses activation of a power switch (or other similar user input) of a printing apparatus that controls whether a power supply is connected to and supplies power to a processor, a printing engine, and a graphic user interface of the printing apparatus.

In item 102, this method automatically delays (using the processor) disconnection of the power supply from the graphic user interface until status information can be displayed on the graphic user interface. Then, in item 104, this method causes (again, using the processor) the graphic user interface to display status information of the printing apparatus. More specifically, item 104 occurs immediately prior to the switch being allowed to disconnect the power supply from the graphic user interface.

Then, in item 106, after the graphic user interface displays the status information of the printing apparatus in item 104, the processor allows the action of the switch to disconnect the power supply from the graphic user interface. The graphic user interface comprises a bistable display that continues to show the most recently provided screenshot, even after the switch disconnects the power supply from the graphic user interface. Therefore, after item 106, the graphic user interface displays the status information after being disconnected from the power supply.

Figure 2:
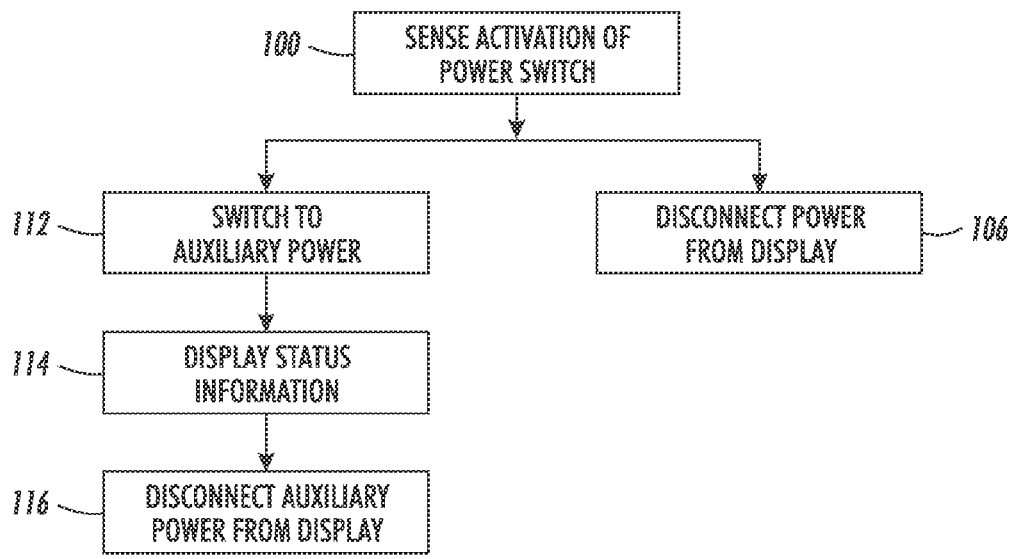
FIG. 2 is a flowchart illustrating an embodiments herein.

FIG. 2 is a flowchart that illustrates an alternative method herein. This flow again begins in item 100 by again sensing activation of the power switch. Upon activation of the power switch, the power is immediately disconnected from the display (again in item 106). However, in this embodiment, simultaneously with disconnection of the power supply, in item 112, an auxiliary power supply (such as a battery, solar cell, back-EMF voltage from electric actuators, etc.) is connected to the processor and the graphic user display.

Then, as before (in item 114) this method causes (again, using the processor) the graphic user interface to display status information of the printing apparatus. Then, in item 116, after the graphic user interface displays the status information of the printing apparatus in item 114, the processor disconnects the auxiliary power supply from the graphic user interface. After item 116, the graphic user interface displays the status information after being disconnected from the power supply.

Figure 3:
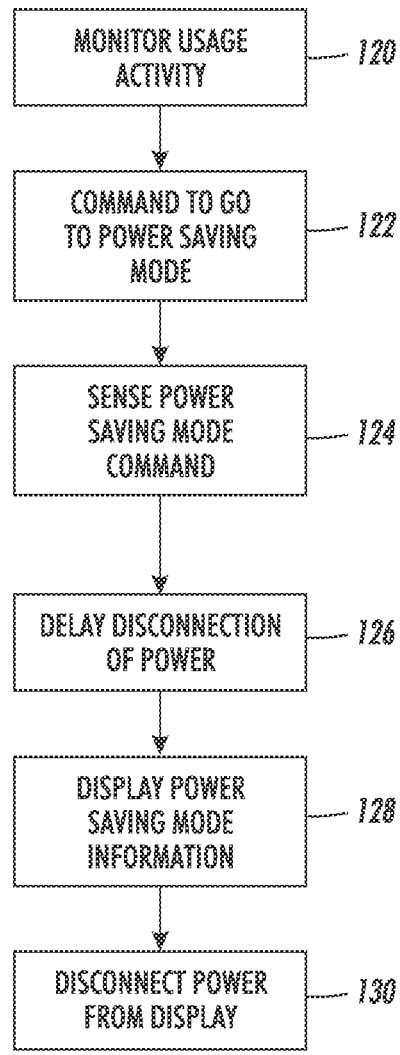
FIG. 3 is a flowchart illustrating an embodiments herein.

FIG. 3 is flowchart illustrating another exemplary method herein that controls whether the power supply is connected to and supplies power to the graphic user interface of a printing apparatus during power saving mode. In item 120, this method monitors the activity usage level of a printing apparatus having a graphic user interface and, in item 122, commands the printing apparatus to go into a power saving mode based on the activity usage level dropping below some previously established level (non-usage time, time of day, day of the week, etc.). For example, in item 122, the device processor can issue a command to begin one of potentially many power saving modes, which are often referred to as low-power modes, power-reduction modes, sleep modes, inactive modes, etc.

Power saving modes only supply power to a few device elements to save power, yet allow the device to return to full operational mode (full power mode) more quickly when compared to the time needed to reach full operational mode from a full off condition (where all systems are disconnected from the power supply). Such power saving modes are begun when the device has not received any input from users or other devices within a specific time period (as determined by performing the monitoring in item 120). Such power saving modes generally start a routine that saves certain information in the storage device, selects which items will be disconnected from the power supply, resets various flags, etc., and then disconnects the power supply from selected elements of the device that will not be powered during the power saving mode.

In item 124, such methods and systems sense whether the power supply will be disconnected from the graphic user interface based on the power saving mode command in item 122. Item 126 delays (using the processor) disconnection of the power supply from the graphic user interface until power saving mode information can be displayed on the graphic user interface in item 128. More specifically, in item 128, this exemplary method causes (using the processor) the graphic user interface to display power saving mode information of the printing apparatus (instructions for a user to take to have the printing apparatus leave power saving mode) immediately prior to the power supply being disconnected from the graphic user interface in item 130. The power saving mode information comprises, for example, instructions for a user to take to have the printing apparatus leave power saving mode and can also include consumable supply levels, printer operational status, and/or warning messages. Thus, in item 130, after the graphic user interface displays the power saving mode information of the printing apparatus in item 128, the processor allows the power supply to be disconnected from the graphic user interface.

The graphical user interface comprises a bistable display that continues to show a most recently provided screenshot after the power supply is disconnected from the graphic user interface in item 130. Therefore, the graphic user interface continues to display the power saving mode information after being disconnected from the power supply. Item 128 occurs immediately prior to the power supply being disconnected from the graphic user interface.

Figure 4:
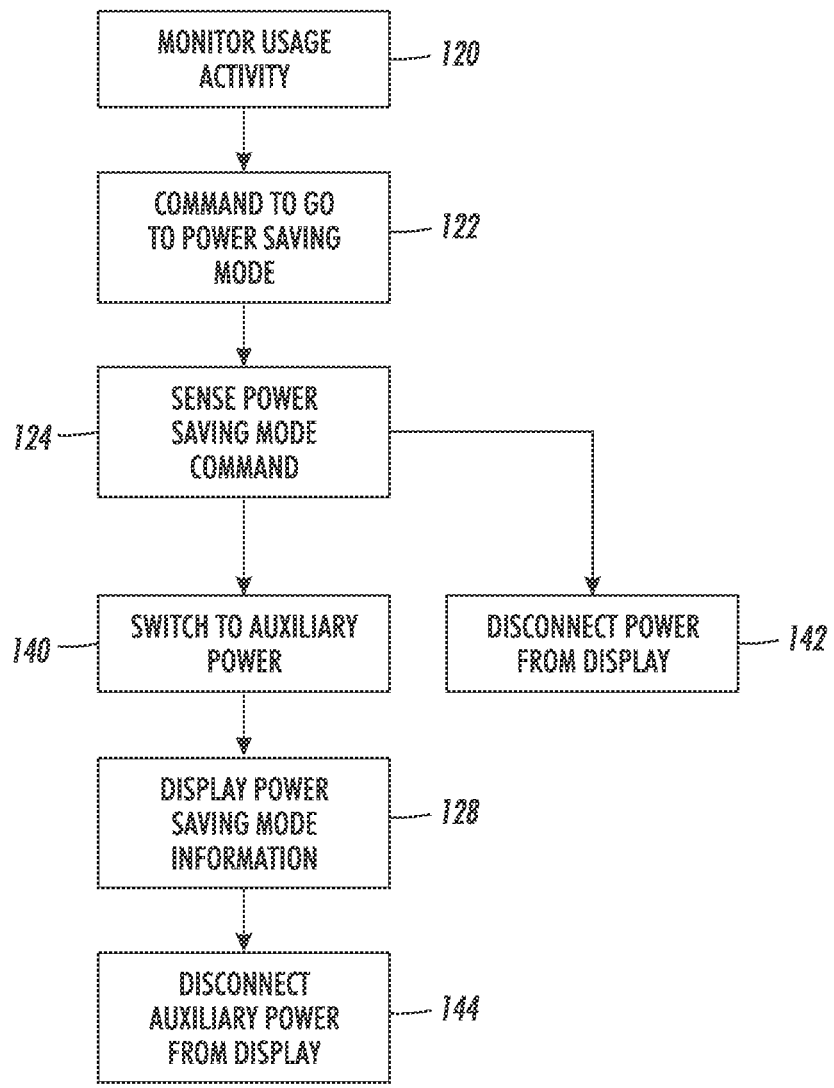
FIG. 4 is a flowchart illustrating an embodiments herein.

FIG. 4 is a flowchart that illustrates an alternative method herein. This flow again begins in item 120 by again monitoring the activity usage level of a printing apparatus having a graphic user interface and, in item 122, commanding the printing apparatus to go into a power saving mode based on the activity usage level. Also, in item 124, such methods and systems sense the power saving mode command in item 122. However, in this embodiment, the printing apparatus is placed into power savings mode without delay and the power supply is disconnected from the graphic user interface in item 142, simultaneously with the auxiliary power supply (such as a battery, solar cell, back-EMF voltage from electric actuators, etc.) being connected to the graphic user display (and potentially to the processor) in item 140.

Then, as before (in item 128) this method causes (again, using the processor) the graphic user interface to display power saving mode information of the printing apparatus. Then, in item 144, after the graphic user interface displays the power saving mode information of the printing apparatus in item 128, the processor disconnects the auxiliary power supply from the graphic user interface. After item 144, the graphic user interface displays the power saving mode information after being disconnected from the auxiliary power supply.

Figure 5:
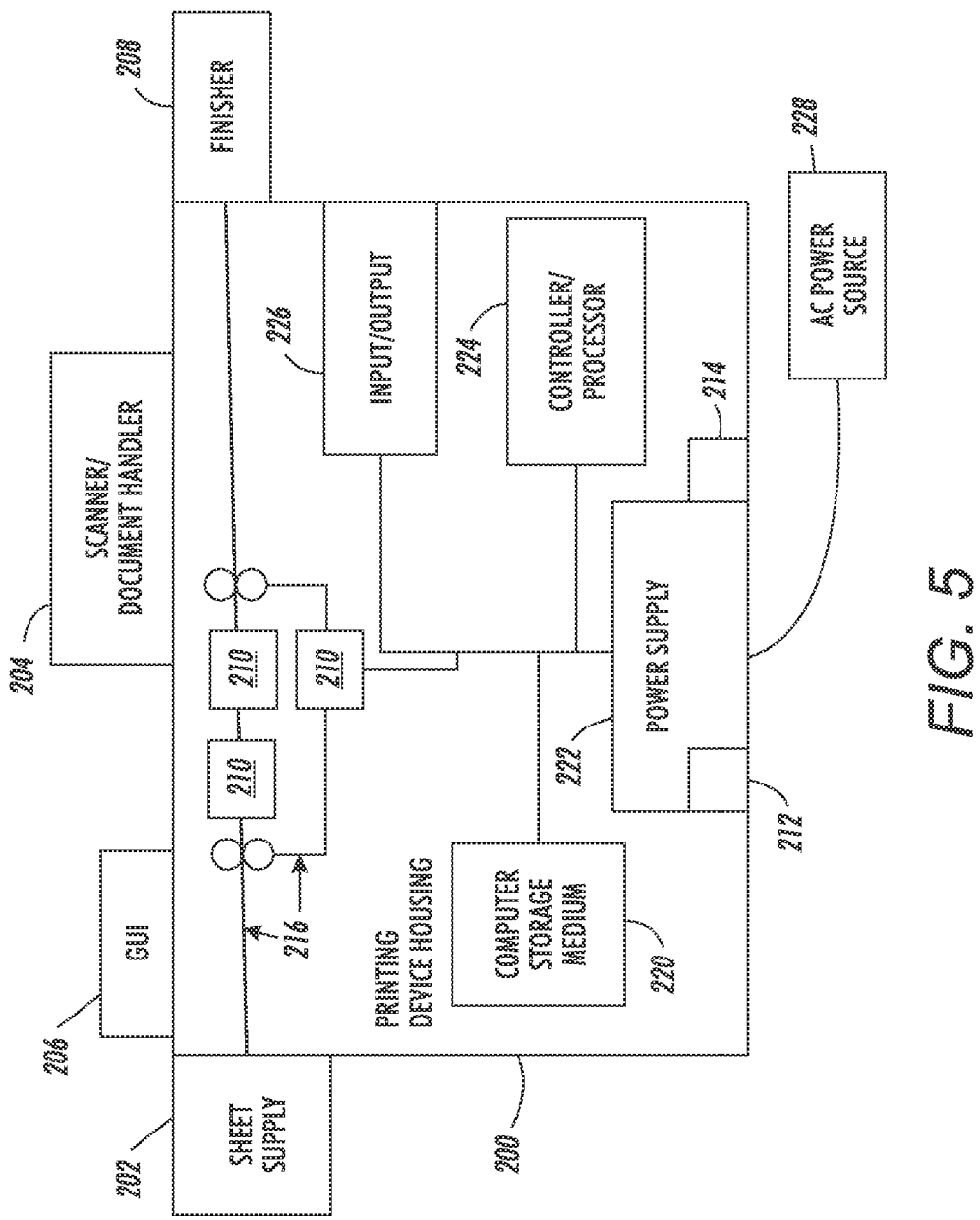
FIG. 5 is a side-view schematic diagram of a device according to embodiments herein.

FIG. 5 illustrates a computerized printing device 200, which can be used with embodiments herein and can comprise, for example, a printer, copier, multi-function printing device, facsimile machine, stand-alone scanner, etc. (which is often referred to herein simply as an MFD 200). The MFD 200 includes a controller/processor 224, at least one marking device (printing engines) 210 operatively connected to the processor 224, a media path 216 positioned to supply sheets of media from a sheet supply 202 to the marking device(s) 210, and a communications port (input/output) 226 operatively connected to the processor 224 and to a computerized network external to the printing device. After receiving various markings from the printing engine(s), the sheets of media can optionally pass to a finisher 208 which can fold, staple, sort, etc., the various printed sheets.

The input/output device 226 is used for communications to and from the multi-function MFD 200. The processor 224 controls the various actions of the printing device. A non-transitory computer storage medium device 220 (which can be optical, magnetic, capacitor based, etc.) is readable by the processor 224 and stores instructions that the processor 224 executes to allow the multi-function printing device to perform its various functions, such as those described herein.

Thus, a printer body housing 200 has one or more functional components that operate on power supplied from the alternating current (AC) 228 by the power supply 222. The power supply 222 connects to an external alternating current power source 228 and converts the external power into the type of power needed by the various components.

Also, the MFD 200 can include at least one accessory functional component (such as a scanner/document handler 204, sheet supply 202, finisher 208, etc.) and graphic user interface assembly 206 that also operate on the power supplied from the external power source 228 (through the power supply 222).

Therefore, as shown, at least one power supply 222 is operatively connected to (directly or indirectly connected to) at least the processor 224, the printing engine 210, and the graphic user interface 206. Further, the power supply 222 includes a switch 212 that controls whether the power supply 222 is connected to and supplies power to the processor 224, the printing engine, and the graphic user interface 206.

The graphic user interface 206 comprises a bistable display 206 that continues to show the most recently provided screenshot, even after the switch 212 disconnects the power supply 222 from the graphic user interface 206. The bistable display 206 can be, for example, an electrophoretic display, a bichromal balls display, etc.

Figure 6:
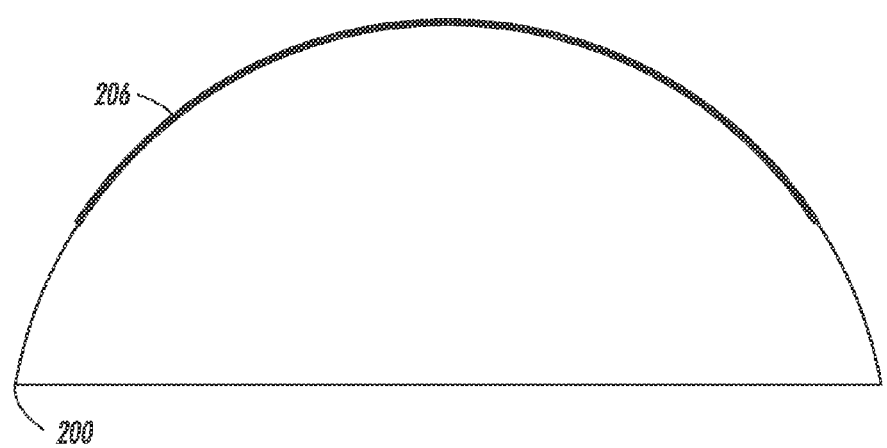
FIG. 6 is a side-view schematic diagram of a device according to embodiments herein.

In addition, the body 200 of the printing apparatus surrounds the processor 224, the printing engine, and power supply 222. As shown in cross-section in FIG. 6, at least a portion of the body 200 may have at least one curved section, and the graphic user interface 206 comprises a curved graphic user interface 206 that conforms to the shape of the curved section of the body 200.

As mentioned above, the processor 224 controls responses to user input to the power switch 212, and the processor 224 causes the graphic user interface 206 to display status information of the printing apparatus immediately prior to disconnecting the power supply 222 from the graphic user interface 206 in response to the user input to the switch 212, such that the graphic user interface 206 displays the status information after being disconnected from the power supply 222. Thus, the processor 224 delays disconnection of the power supply 222 from the graphic user interface 206 until the status information is displayed on the graphic user interface 206.

Alternatively, instead of delaying disconnection of the power supply 222, the processor 224 can engage an auxiliary power supply 214 (such as a battery, solar cell, etc.) to cause the graphic user interface 206 to display status information of the printing apparatus immediately after the switch 212 disconnects the power supply 222 from the graphic user interface 206, such that the graphic user interface 206 will display the status information after being disconnected from the power supply 222. Afterword, the processor 224 disengages the auxiliary power supply 214 once the graphic user interface 206 displays the status information. The status information comprises, for example, consumable supply levels, printer operational status, warning messages, etc.

In another alternative, the processor 224 causes the graphic user interface 206 to display power saving mode information of the printing apparatus immediately prior to disconnecting the power supply 214 from the graphic user interface 206, such that the graphic user interface 206 displays the power saving mode information after being disconnected from the power supply 214. Thus, the processor 224 delays disconnection of the power supply 214 from the graphic user interface 206 until the power saving mode information is displayed on the graphic user interface 206.

In a further alternative, instead of delaying disconnection of the power supply 214, the processor 224 can engage an auxiliary power supply 214 to cause the graphic user interface 206 to display power saving mode information of the printing apparatus immediately after the power supply 214 is disconnected from the graphic user interface 206, such that the graphic user interface 206 will display the power saving mode information after being disconnected from the power supply 214. Afterword, the processor 224 disengages the auxiliary power supply 214 once the graphic user interface 206 displays the power saving mode information.

Thus, the embodiments herein consume a fraction of the power compared to liquid crystal displays, only require power when the display is updated, and don't require power to stay on (e-ink displays can retain the last image almost indefinitely). The high contrast ratio of bistable displays means the embodiments herein are easy on the eyes. Further, the power can be sourced by alternative renewable sources, the bistable displays are more flexible, durable, and lighter than LCD displays, and such displays facilitate touch screen interaction so existing level of functionality with LCD displays is not compromised.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A printing apparatus comprising:
at least one processor;
at least one printing engine operatively connected to said processor; and
at least one graphic user interface operatively connected to said processor; and
at least one power supply connected to said processor, said printing engine, and said graphic user interface,
said processor controlling whether said power supply is connected to and supplies power to said graphic user interface when said printing apparatus is in power saving mode,
said graphical user interface comprising a bistable display that continues to show a most recently provided screenshot after said power supply is disconnected from said graphic user interface, and
said processor causing said graphic user interface to display power saving mode information of said printing apparatus immediately prior to said processor disconnecting said power supply from said graphic user interface such that said graphic user interface displays said power saving mode information after being disconnected from said power supply, and
said processor delaying disconnection of said power supply from said graphic user interface until said power saving mode information is displayed on said graphic user interface.

2. The printing apparatus according to claim 1, said power saving mode information comprising instructions for a user to take to have said printing apparatus leave said power saving mode.

3. The printing apparatus according to claim 1, said power saving mode information comprising consumable supply levels and warning messages.

4. The printing apparatus according to claim 1, said bistable display comprising one of an electrophoretic display, an e-ink display, and a bichromal balls display.

5. A printing apparatus comprising:
at least one processor;
at least one printing engine operatively connected to said processor;
at least one graphic user interface operatively connected to said processor;
at least one power supply connected to said graphic user interface, said processor controlling whether said power supply is connected to and supplies power to said graphic user interface when said printing apparatus is in power saving mode; and
a body surrounding said processor, said printing engine, and power supply,
said graphical user interface comprising a bistable display that continues to show a most recently provided screenshot after said power supply is disconnected from said graphic user interface,
said processor causing said graphic user interface to display power saving mode information of said printing apparatus immediately prior to said processor disconnecting said power supply from said graphic user interface such that said graphic user interface displays said power saving mode information after being disconnected from said power supply, and
said processor delaying disconnection of said power supply from said graphic user interface until said power saving mode information is displayed on said graphic user interface,
said body comprising at least one curved section, and said graphic user interface comprising a curved graphic user interface conforming to a shape of said curved section of said body.

6. The printing apparatus according to claim 5, said power saving mode information comprising instructions for a user to take to have said printing apparatus leave said power saving mode.

7. The printing apparatus according to claim 5, said power saving mode information comprising consumable supply levels and warning messages.

8. The printing apparatus according to claim 5, said bistable display comprising one of an electrophoretic display, an e-ink display, and a bichromal balls display.

9. A printing apparatus comprising:
- at least one processor;
- at least one nting engine operatively connected to said processor;
- at least one graphic user interface operatively connected to said processor; and
- at least one power supply connected to said processor, said printing engine, and said graphic user interface,
- said processor placing said printing apparatus into a power saving mode based on an activity usage level of said printing apparatus;
- said processor controlling whether said power supply is connected to and supplies power to said graphic user interface when said printing apparatus is in said power saving mode,
- said graphical user interface comprising a bistable display that continues to show a most recently provided screenshot after said power supply is disconnected from graphic user interface,
- said processor causing said graphic user interface to display power saving mode information of said printing apparatus immediately prior to disconnecting said power supply from said graphic user interface in response to said processer determining that said printing apparatus should be in said power saving mode, such that said graphic user interface displays said power saving mode information after being disconnected from said power supply, and
- said processor delaying disconnection of said power supply from said graphic user interface until said power saving mode information is displayed on said graphic user interface.

10. The printing apparatus according to claim 9, said power saving mode information comprising instructions for a user to take to have said printing apparatus leave said power saving mode.

11. The printing apparatus according to claim 9, said power saving mode information comprising consumable supply levels and warning messages.

12. The printing apparatus according to claim 9, said bistable display comprising one of an electrophoretic display, an e-ink display, and a bichromal balls display.

13. A method comprising:
- monitoring an activity usage level of a printing apparatus having a graphic user interface using a processor of said printing apparatus;
- commanding said printing apparatus to go into a power saving mode based on said activity usage level using said processor;
- sensing whether a power supply is to be disconnected from said graphic user interface based on said printing device going into said power saving mode using said processor, said graphical user interface comprising a bistable display that continues to show a most recently provided screenshot after said power supply is disconnected from said graphic user interface;
- causing, using said processor, said graphic user interface to display power saving mode information of said printing apparatus immediately prior to said power supply being disconnected from said graphic user interface such that said graphic user interface displays said power saving mode information after being disconnected from said power supply; and
- delaying, using said processor, disconnection of said power supply from said graphic user interface until said power saving mode information is displayed on said graphic user interface.

14. The method according to claim 13, said power saving mode information comprising instructions for a user to take to have said printing apparatus leave said power saving mode.

15. The method according to claim 13, said power saving mode information comprising consumable supply levels and warning messages.

16. The method according to claim 13, said bistable display comprising one of an electrophoretic display, an e-ink display, and a bichromal balls display.

\* \* \* \* \*